United States Patent [19]

Huber

[11] Patent Number: 5,163,480
[45] Date of Patent: Nov. 17, 1992

[54] CONDUIT ISOLATION DIAPHRAGM ASSEMBLY

[76] Inventor: Donald G. Huber, P.O. Box 64160, Tacoma, Wash. 98464

[21] Appl. No.: 735,198

[22] Filed: Jul. 24, 1991

Related U.S. Application Data

[63] Continuation of Ser. No. 251,745, Oct. 3, 1988, abandoned.

[51] Int. Cl.⁵ .................. F16L 55/10; G01H 3/04
[52] U.S. Cl. ............................. 138/94; 138/89; 138/90; 73/49.8
[58] Field of Search ............... 138/89, 90, 94; 73/49.8; 277/DIG. 10; 4/255, 295

[56] References Cited

U.S. PATENT DOCUMENTS

| | | | |
|---|---|---|---|
| 3,327,379 | 6/1967 | Clements | 138/96 R |
| 3,467,271 | 9/1969 | Kaiser et al. | 138/89 |
| 4,175,592 | 11/1979 | Coone | 138/94 |
| 4,376,597 | 3/1983 | Britton et al. | 138/89 |
| 4,429,568 | 2/1984 | Sullivan | 138/94 |
| 4,542,642 | 9/1985 | Tagliarino | 73/49.8 |
| 4,602,504 | 7/1986 | Barber | 73/49.8 |
| 4,607,664 | 8/1986 | Carney et al. | 138/89 |
| 4,706,482 | 11/1987 | Barber | 138/89 |
| 4,763,510 | 8/1988 | Palmer | 73/49.8 |
| 4,848,155 | 7/1989 | Huber | 138/90 |

Primary Examiner—James E. Bryant, III
Attorney, Agent, or Firm—David L. Garrison

[57] ABSTRACT

An isolation diaphragm assembly designed to be installed in a standard tee, Y or coupling in a conduit to isolate one portion of the conduit from another. In its initially installed condition, the isolation diaphragm assembly provided a seal for isolating portions of conduit systems for pressure testing. Once the testing procedures are complete, the test diaphragm, being larger in diameter than the interior diameter of the conduit, is flexed into a saddle shape to permit its removal from a gasket and due to the decreased dimension, may then be drawn out of the conduit, leaving a fully unobstructed flow path.

2 Claims, 2 Drawing Sheets

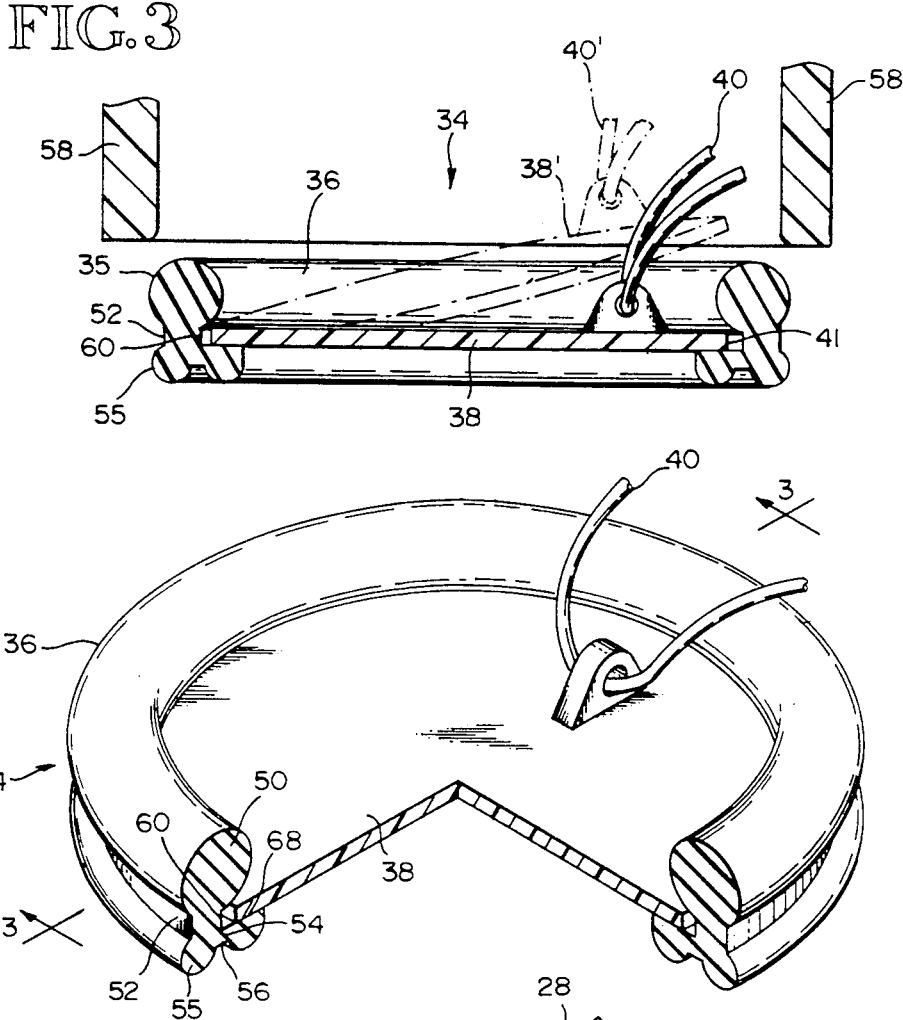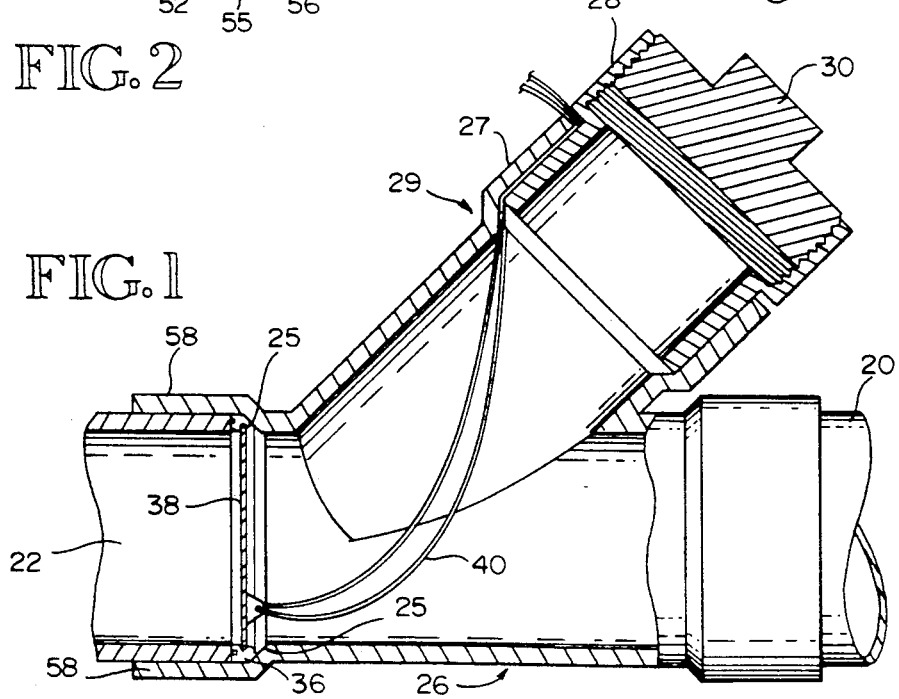

CONDUIT ISOLATION DIAPHRAGM ASSEMBLY

This is a continuation of co-pending application Ser. No. 07/251,745 filed on Oct. 3, 1988 now abandoned.

TECHNICAL FIELD

This invention relates to a conduit isolation diaphragm assembly designed to be installed, for example, within the sewer drainage system of a building. More particularly, this invention relates to a conduit isolation diaphragm assembly designed to be installed between a sewage conduit in a new or rebuilt building and a sewage service line, thereby isolating the sewage line from the sewage service line and permitting pressure testing of the conduit.

BACKGROUND ART

In building construction, a newly installed or repaired operating sewage conduit in the building waste or sewer drainage system must frequently be isolated from the sewage service line until the plumbing construction is tested, inspected and certified. It is common practice within the construction industry to place an outlet end of a newly installed sewage conduit of the building at a juncture near an inlet to a sewage service line. During installation, these two lines are capped and not connected. Where these two lines would otherwise meet, each line is capped-off until testing and inspection is complete to meet building code requirements the system within the building usually must be subjected to a fluid pressure test to locate any leaks. As a result of usual construction techniques, the juncture is frequently buried before the tests are preformed. After testing and inspection is complete, the juncture is re-excavated, the caps removed, and a secure connection of the two lines is made.

Various patents have been issued disclosing test or isolation valve assemblies used in the inspection of the system prior to connection of the sewer line.

Sullivan U.S. Pat. No. 4,429,568, discloses a closure plug for pressure testing a liquid drain and vent plumbing type system. Sullivan uses a clean-out Y for access to open the plug plate assembly.

Cohen U.S. Pat. No. 1,720,819, discloses a test tee having a tapered gate which closes off a house drain pipe from a drainage system. After the test has been completed, the gate is removed from the test tee and the resulting opening in the tee is closed by a cover plate.

Tagliarnio U.S. Pat. No. 4,542,642, discloses a test tee having a plug which is a removable blocking disk. The blocking disk engages a ledge in the test tee and seals the drainage system. The diaphragm is accessible and removable through an access means.

Roberson U.S. Pat. No. 4,658,861, discloses a pneumatic plug inserted through a clean-out tee to block off a house service line to the main sewer line.

Kennedy U.S. Pat. No. 1,948,220, discloses a test plumbing system using a flap valve which is pivoted at an upper side of a valve seat. The flap valve is held in position by a valve adjusting rod.

Barber U.S. Pat. No. 4,602,504, shows a permanently installed test fitting in which a seal diaphragm has a frangible, removable portion which may be broken away from the diaphragm and removed to permit service use of the system. A portion of the seal diaphragm remains permanently in the conduit with its edge exposed.

The listed references relate to the general field of disclosure of this invention but many suffer from the permanent presence of apparatus in the conduit which can catch refuse and cause pluggage. The references are cited as the closest art of which the inventor is aware.

DISCLOSURE OF INVENTION

An object of this invention is to provide a removable isolation diaphragm for conduits.

A further object is to provide a simplified conduit isolation diaphragm assembly having a removable diaphragm especially useful in the waste water system of a building to isolate the waste water system conduit from the sewage service line of a public or private sewer system.

Another object is to provide a conduit isolation diaphragm assembly having sufficient strength and resiliency to resist the hydraulic test pressure applied testing procedures while being removable without dismantling the conduit in which it is installed, leaving none of the diaphragm within the conduit and no flow constriction therein.

Another object is to provide an isolation diaphragm assembly which may be easily and quickly installed within the sewer drainage system of a building.

Another object is to provide an isolation diaphragm assembly having a diaphragm having a diameter exceeding the inside diameter of the conduit in which it is installed, which is easily removable from the assembly without requiring the juncture where the assembly is located to be unearthed, disconnected, dismantled, or reconnected to the sewage service line.

A further general object is to provide a conduit isolation diaphragm assembly useful in other fluid conduit systems such as are widely used in the chemical process industries.

Another object is to provide a means of isolating and pressure testing certain parts of a large plumbing waste system, such as the upper floors of a multi-story building, in a manner that does not require disassembly of the plumbing system to activate the system for use after the testing is completed.

The conduit isolation diaphragm assembly is designed to be installed in a conduit system such as that serving a building either outside or inside the building. The conduit isolation diaphragm assembly may be used to isolate a sewage line of the newly constructed or repaired sewer drainage system of the building from a sewage service line and permits pressure testing and inspection of the newly installed or repaired line before placing the line into service.

The isolation diaphragm assembly comprises a gasket, a removable diaphragm, and removal means, all to be assembled within a standard joint structure in a conduit.

The gasket is appropriately shaped and dimensioned to allow for a secure, sealed fitting when it is inserted into a conduit joint structure. The gasket carrying the diaphragm is sized so that its interior diameter equals or exceeds the interior conduit diameter.

The diaphragm is carried by and is removable from the gasket. The diaphragm is constructed from a suitable somewhat flexible material and has an outer diameter which slightly exceeds the inside diameter of the conduit. A secure seal is made using the gasket which abuts the end of a conduit inserted into a tee or coupling fitting. A cord or other flexible means is attached to the diaphragm at a point opposite the tee or Y and may be used to flex the diaphragm and thereby dislodge it from the gasket. The diaphragm is then pulled through the conduit in a curved or flexed state and out of a cleanout or tee port in the conduit. Having the outer diameter of the diaphragm exceed the inner diameter of the conduit insures the positive seal needed to perform pressure testing. The flexibility of the diaphragm permits its removal through a conduit having a diameter smaller than the diaphragm diameter. Upon removal of the diaphragm the inside of the conduit has no protrusions or sharp edges which could cause pluggage.

BRIEF DESCRIPTION OF THE DRAWINGS

FIG. 1 is a side elevational view, partially in section, of an operating sewage line, a service sewage line and one embodiment of a conduit isolation diaphragm assembly as described herein.

FIG. 2 is a perspective view of the diaphragm and gasket used in the apparatus shown in FIG. 1.

FIG. 3 is an enlarged cross sectional view of the diaphragm and gasket shown in FIGS. 1 and 2 with the general position and shape of the partially flexed diaphragm after initial removal steps have started shown in phantom lines.

BEST MODE FOR CARRYING OUT THE INVENTION

Figure 4:
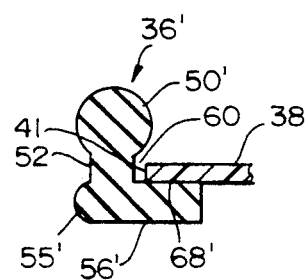
FIG. 4 is a partial cross sectional view of one preferred embodiment of the gasket.

Referring to the drawings, and particularly to FIGS. 1, 2 and 3, wherein like numerals indicate like parts, a waste water conduit system of a building, which has an outlet conduit 20 of conventional design, is shown, connected to a sewage service line conduit 22. Outlet conduit 20 and sewage service line conduit 22 may be connected by a conventional tee or Y fitting. FIG. 1 shows conduit 20 being connected to sewage service line 22 by a Y cleanout fitting 26 having a threaded adapter 28 glued into the side run 29. A removable threaded plug 30 provides access for cleanout purposes as well as access for removal of diaphragm 38 as is more fully described below.

As is best seen in the enlarged views of FIGS. 2 and 3, the isolation diaphragm assembly 34 comprises a gasket 36, flexible and removable diaphragm 38, and removal cord 40 attached as shown to diaphragm 38. Isolation diaphragm assembly 34 is positioned within the drainage system of the building to isolate sewage line 20 from conduit 22 thereby providing a water-tight seal during testing procedures. Isolation diaphragm assembly 34, and particularly gasket 36 and diaphragm 38, are appropriately shaped and dimensioned to seal and isolate sewage line 20 from sewage service line 22. Isolation diaphragm assembly 34 is also of sufficient resiliency and strength to resist the hydraulic pressures exerted on it during construction and testing procedures.

The gasket 36 used in this invention may take the cross sectional shape shown in any of FIGS. 3 - 6 for specific purposes. One preferred embodiment is shown in FIG. 3 in which the gasket 36 is molded from material such as rubber or other resilient plastic materials and has an enlarged toroidal section 35 to engage a chamfer 25 in Y 26. When inserted into the female or flared portion 58 of Y 26, the toroidal portion 50 of gasket 36 rolls over into secure sealing contact with diaphragm 38 to securely seal the diaphragm 38 in place thereby providing fluid tight seal isolating conduit 20 from line 22. The gasket 36 also includes a necked down groove forming portion 52, and a base portion 54. A second substantially toroidal section 55 is provided to engage and seal against the generally planar end of sewage conduit 22. Base portion 54 also has a flat conduit engaging surface 56 which lies in a plane substantially perpendicular to the axis of the conduit with which the device is used and includes a third part toroidal portion 57 to seal against the end surface of conduit 22. A second flat surface 68 lies in a plane parallel to the plane including flat 56 and is adapted to receive and seal against the circumferential portion of diaphragm 38. The substantially toroidal portions 50 and 55 have an outer circumference exceeding the inside diameter of the flared coupling area 58 of Y 26. However, the resiliency of the gasket variously shown in FIGS. 3 - 6 permits it to be compressed slightly and then inserted into the flared end 58 of tee 26 thereby forming a secure seal about the periphery thereof and against one surface of diaphragm 38. A gap 60 between the circumferential edge 41 of diaphragm 38 and gasket 36 permits diaphragm 38 to be moved slightly to one side permitting removal as more fully described below. Once the gasket and diaphragm assembly is inserted into the open end of cleanout tee 26, an appropriate solvent or glue may be applied to the interior surface of flared portion 58 or the exposed surface of conduit 22 and the parts are joined by inserting conduit 22 firmly into the flared portion 58 until it seats against gasket 36. Diaphragm 38 is thus captured and held in position within the annular recess defined by the cleanout Y 26 and the end of conduit 22.

Figure 5:
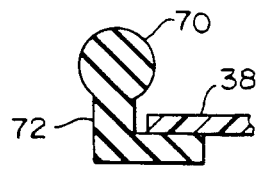
FIG. 5 is a partial cross sectional view of a second embodiment of the gasket.
Figure 6:
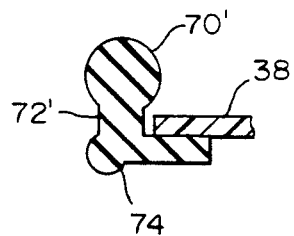
FIG. 6 is a partial cross sectional view of another embodiment of the gasket.

FIGS. 4, 5 and 6 show alternate configurations of the gasket which may also be used in this invention among other configurations. FIG. 4 has comparable elements to those described above but with primed numerals and is especially useful in situations in which the end of conduit 22 is smooth and in a plane perpendicular to the axis thereof. FIG. 5 has a toroidal portion 70 which exceeds diameter and an outer diameter at face 72 which may be equal to the inside diameter of flared portion 58. When inserted the toroidal portion 70 is compressed and rolled over into sealing contact with diaphragm 38. The embodiment shown in FIG. 6 includes a lower toroidal segment 74 useful in situations in which the end of conduit 22 is irregular. Surface 72' approximates the inner diameter of the flared portion 58 of Y 26 and the toroidal portion 70', when installed in the coupling, is rolled over and forced into sealing engagement with diaphragm 38. In all instances the gasket is of a sufficiently resilient material such that the diaphragm 38 can be flexed and displaced by a strong pull on cord 40. Removal cord 40 is shown in FIG. 1 as having been inserted into and captured by the joint between the enlarged portion 27 of Y 26 and threaded adapter means, 28. The parts are simply glued together with the ends of cord 40 projecting into the joint therebetween. Alternatively, the ends of cord 40 may be attached to plug 30.

The diaphragm may be formed with a dome shaped central portion to resist pressure applied during testing procedures and to enhance the seal between the diaphragm and the conduit.

Being slightly larger in diameter than the inside diameter of conduit 22, the diaphragm 38 achieves a good seal and seating against the flat end surface of conduit 22 and can withstand a substantial fluid pressure needed to perform the system pressure testing procedures. When it is desired to remove the diaphragm 38, plug 30 is removed from the threaded coupling 29 and cord 40 is grasped firmly. A continuing pull on cord 40 causes edge 41 to attempt to pass over the interior surface of toroidal portion 35 of gasket 36. The opposite edge of diaphragm 38 is then forced into gap 60 tightly against the gasket permitting edge 41 to pass into the interior of Y fitting 26. In doing so, the flexible diaphragm 38 assumes a non planar shape in which the edges thereof are cupped downwardly so that it may pass through the interior of Y 26 even though its outer diameter exceeds the inside diameter of the various runs of Y 26. The diaphragm 38 is then removed through threaded adapter 29 and from the system. At that time the cord 40 may be severed and plug 30 returned to its sealed position. Although gasket 36 remains inside the joint structure, it has no elements protruding into the flow cross section of the conduits. Likewise, since the entirety of flexible diaphragm 38 is removed from the system, no edges remain to potentially cause build up and pluggage.

INDUSTRIAL APPLICABILITY

This invention is particularly effective and well adapted for use in grade level sewage systems in which a newly installed or repaired sewer drainage system of a building must be isolated from a sewage service line. The isolation diaphragm assembly has a gasket secured to the sewer drainage system. A flexible, removable diaphragm is attached to and carried by the gasket. The flexible, removable diaphragm isolates the waste water conduit of the building construction site from the sewage service line so that pressure testing of the system can be done at an appropriate stage of construction. The system can then be easily activated for use by merely removing the diaphragm by pulling on an attached removal means, thereby opening communication between the newly installed waste water conduit and the sewage service line without requiring the juncture to be unearthed or otherwise accessed.

In compliance with the statute, the invention has been described in language more or less specific as to structural features. It is to be understood, however, that the invention is not limited to the specific features shown, since the means and construction herein disclosed comprise the preferred form of putting the invention into effect. The invention is claimed in all of its forms or modifications within the legitimate and valid scope of the appended claims, appropriately interpreted in accordance with the doctrine of equivalents.

I claim:

1. An isolation diaphragm assembly for isolating conduit portions for pressure testing, comprising:
   (a) a conduit coupling for connection to one end of a conduit, said coupling includes a flared coupling area having a flared area inside diameter, and a side directed cleanout port area having a cleanout area inside diameter, wherein said flared coupling area inside diameter is greater than said cleanout area inside diameter, and each inside diameter being connected to the other by a chamfered area, said coupling also including a side directed cleanout port attached to said coupling at said cleanout area;
   (b) a gasket for insertion within said flared area inside diameter of said coupling, said gasket having an enlarged substantially toroidal portion and a diaphragm seat for receiving and sealing against a substantially circular flexible diaphragm, said enlarged portion having an outer diameter larger than the flared area inside diameter of said flared coupling area, said enlarged toroidal portion being integrally connected to said seat, said gasket being made of a flexible material such that during installation, said enlarged toroidal portion is forced against an interior wall of said flared coupling area and thereby into fluid tight engagement with said diaphragm and said flared coupling area;
   said gasket further including a coupling seating surface for seating against a chamfered surface located inside said coupling, and a conduit seating surface for seating against an end portion of said conduit, said gasket having an interior diameter which is greater than said cleanout area inside diameter, wherein said gasket is full contained within an annular space formed between said end of said conduit and said chamfered area;
   (c) said diaphragm being receivable in said seat, said seat includes an inwardly facing groove in fluid tight sealing relation with said diaphragm, said diaphragm and said gasket forming a conduit closure thereby preventing flow of fluid between said conduit portions, said diaphragm having an outer diameter exceeding said cleanout area inside diameter; and
   (d) removal means for disengaging and removing said diaphragm from said gasket and from said coupling through said side directed cleanout port, said removal means being connected to said diaphragm, whereby pulling on said removal means causes said diaphragm to be disconnected from said gasket and flex into a noncircular shape permitting removal from said coupling while leaving no elements protruding within said diameter of said coupling cleanout area.

2. The apparatus of claim 1, wherein said gasket further comprises a second enlarged portion having an outer circumferential diameter larger than said cleanout area inside diameter of said conduit, said second enlarged portion engaging and sealing against said flared end and against said end surface of said conduit inserted into said flared coupling area to securely seal said apparatus.

* * * * *